US008844992B1

(12) United States Patent
Noga et al.

(10) Patent No.: US 8,844,992 B1
(45) Date of Patent: Sep. 30, 2014

(54) VEHICLE, A CLIP ASSEMBLY FOR THE VEHICLE, AND A METHOD OF MANUFACTURING THE CLIP ASSEMBLY

(71) Applicant: GM Global Technology Operations LLC, Detroit, MI (US)

(72) Inventors: Scott M. Noga, Rochester, MI (US); John T. Kavanagh, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/891,674

(22) Filed: May 10, 2013

(51) Int. Cl.
*B62D 39/00* (2006.01)
*B60R 13/02* (2006.01)

(52) U.S. Cl.
CPC .................. *B60R 13/0206* (2013.01)
USPC ............................ 296/1.08; 24/289

(58) Field of Classification Search
USPC .......... 296/1.08; 24/289, 297, 457, 458, 326, 24/302
See application file for complete search history.

(56) References Cited

U.S. PATENT DOCUMENTS

| | | | | |
|---|---|---|---|---|
| 4,458,388 A * | 7/1984 | Farago et al. | ............... | 24/115 R |
| 6,116,677 A * | 9/2000 | Gac et al. | ................... | 296/65.16 |
| 6,394,695 B1 * | 5/2002 | Chausset | ...................... | 403/397 |
| 6,402,188 B1 * | 6/2002 | Pasch | ......................... | 280/728.2 |
| 6,431,585 B1 * | 8/2002 | Rickabus et al. | .......... | 280/728.3 |
| 7,454,826 B2 * | 11/2008 | Nessel et al. | ................... | 29/453 |
| 7,832,064 B2 * | 11/2010 | Nessel et al. | ................... | 24/297 |
| 2007/0113382 A1 * | 5/2007 | Nessel et al. | ................... | 24/289 |
| 2009/0133233 A1 * | 5/2009 | Nessel et al. | ................. | 24/589.1 |
| 2010/0199464 A1 * | 8/2010 | Sano | .............................. | 24/289 |

* cited by examiner

*Primary Examiner* — Lori Lyjak
(74) *Attorney, Agent, or Firm* — Quinn Law Group, PLLC

(57) ABSTRACT

A vehicle, a clip assembly for the vehicle and a method of manufacturing the clip assembly are disclosed. The clip assembly includes a first housing and a second housing attached to the first housing to define a pre-deployed position and detached from the first housing to define a deployed position. The clip assembly also includes a strap formed of a plurality of strands braided together. The strap is affixed to the first and second housings to tether together the first and second housings in both the pre-deployed and deployed positions. The clip assembly further includes an attachment member attachable to the first housing and detachable from the first housing to adjust the attachment member relative to the first housing.

20 Claims, 7 Drawing Sheets

US 8,844,992 B1

VEHICLE, A CLIP ASSEMBLY FOR THE VEHICLE, AND A METHOD OF MANUFACTURING THE CLIP ASSEMBLY

TECHNICAL FIELD

The present disclosure relates to a vehicle and a clip assembly for the vehicle, as well as a method of manufacturing the clip assembly.

BACKGROUND

A vehicle can include a side airbag along a door inside a passenger compartment. Generally, a trim piece covers the side airbag inside the passenger compartment to conceal the side airbag from an occupant of the vehicle. Various devices have been utilized to maintain the trim piece secured to a frame of the vehicle while allowing the side airbag to deploy between the trim piece and the frame.

For example, some designs use two separate latch components that mate with each other. In particular, one of the latch components is affixed with screws to the trim piece and the other one of the latch components is affixed with screws to the frame. Each of the latch components have a female fastener formed of plastic and a male fastener formed of plastic, with a strap disposed between the female and male fasteners. The male fasteners of the latch components engage to the female fasteners of the latch components to secure together the trim piece and the frame. The latch components are attached to the respective frame and the trim piece such that there is slack in each of the straps to allow the trim piece to move away from the frame when the airbag is deployed to expose the airbag. However, the female and male fasteners are not removable from the latch components, and thus are permanently affixed to the latch components.

As another example, other designs use a single latch component. The latch component is formed of molding plastic into a first end, a second end and a pair of cords securing the first and second ends to each other. As such, the first and second ends and the cords are molded together to form a single unit of the same plastic material. A fastener piece is molded to one of the first and second ends to cooperate with the other one of the first and second ends. However, the fastener piece is not removable from the molded end, and thus is permanently affixed to the latch component. The first and second ends are attached to each other, and additionally, the first end is attached to the trim piece and the second end is attached to the frame. The cords allow the first and second ends to move away from each other when the airbag is deployed to allow the trim piece to move away from the frame to expose the airbag. However, the cords can be affected by temperature fluctuations.

SUMMARY

The present disclosure provides a clip assembly for a vehicle. The clip assembly includes a first housing adapted to be attached to the vehicle. The clip assembly further includes a second housing attached to the first housing to define a pre-deployed position and detached from the first housing to define a deployed position. The clip assembly also includes a strap formed of a plurality of strands braided together. The strap is affixed to the first and second housings to tether together the first and second housings in both the pre-deployed and deployed positions. The clip assembly further includes an attachment member attachable to the first housing and detachable from the first housing to adjust the attachment member relative to the first housing.

The present disclosure also provides a vehicle including a vehicle structure and a trim panel coupled to the vehicle structure. The vehicle also includes a clip assembly, with the clip assembly including a first housing attached to the vehicle structure and a second housing attached to the trim panel such that the clip assembly couples the trim panel to the vehicle structure. The second housing is attached to the first housing to define a pre-deployed position and detached from the first housing to define a deployed position. The clip assembly further includes a strap formed of a plurality of strands braided together, with the strap affixed to the first and second housings to tether together the first and second housings in both the pre-deployed and deployed positions. The clip assembly also includes an attachment member attachable to the first housing and detachable from the first housing to adjust the attachment member relative to the first housing.

The present disclosure further provides a method of manufacturing a clip assembly. The method includes providing a strap formed of a plurality of strands braided together. The method also includes affixing a first housing to a first end of the strap. Furthermore, the method includes affixing a second housing to a second end of the strap such that the strap tethers together the first and second housings to define the clip assembly. In addition, the method includes attaching an attachment member to the first housing to further define the clip assembly. Attaching the attachment member to the first housing occurs after affixing the first housing to the first end of the strap.

Therefore, the first and second housings can be standardized while the attachment member can be adjusted to allow the clip assembly to be utilized for different vehicle configurations or specifications. For example, the attachment member can be moved relative to the first housing to change an orientation of the attachment member relative to the first housing. As another example, the attachment member can be replaced by another attachment member having the same or different configuration to accommodate different vehicle configurations or specifications. Being able to adjust the attachment member provides a versatile clip assembly which can reduce manufacturing costs. Additionally, this clip assembly does not need any access cover as discussed above under the background section, and therefore, the trim panel and the clip assembly can be quickly disassembled from the vehicle structure.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
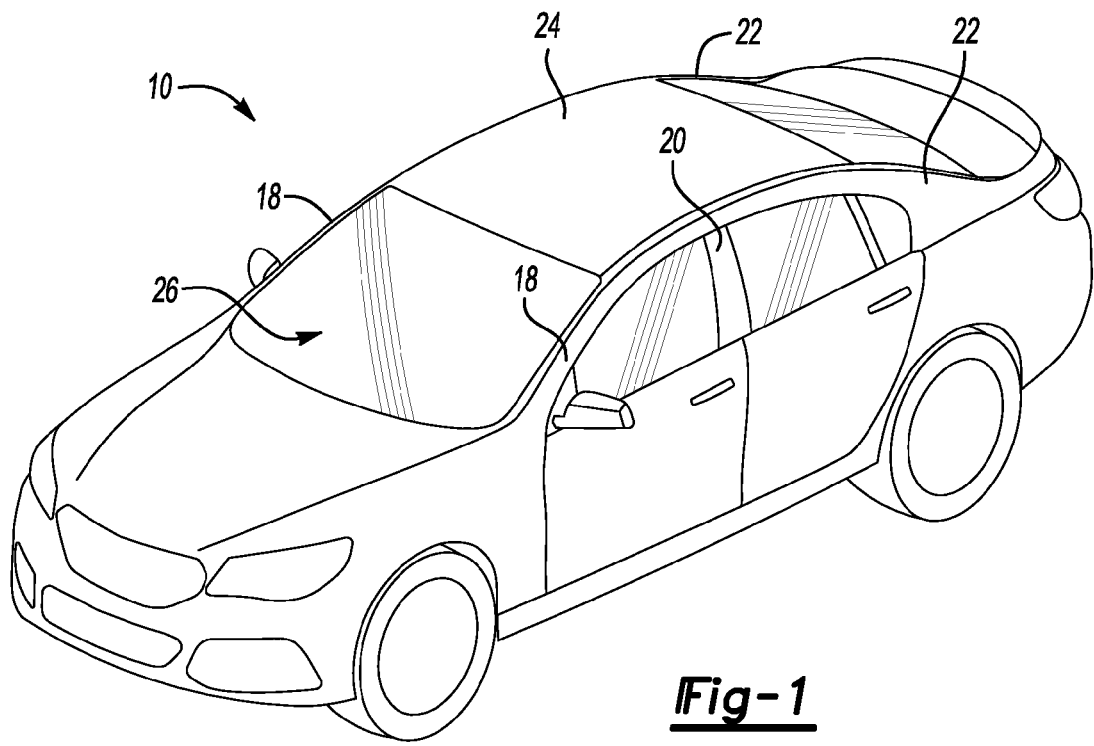
FIG. 1 is a schematic perspective view of a vehicle.

Referring to the Figures, wherein like numerals indicate like or corresponding parts throughout the several views, a vehicle 10 is generally shown in FIG. 1 and a clip assembly 12 for the vehicle 10 is generally shown in FIGS. 2-7. Therefore, the vehicle 10 includes the clip assembly 12 as detailed herein.

Figure 2:
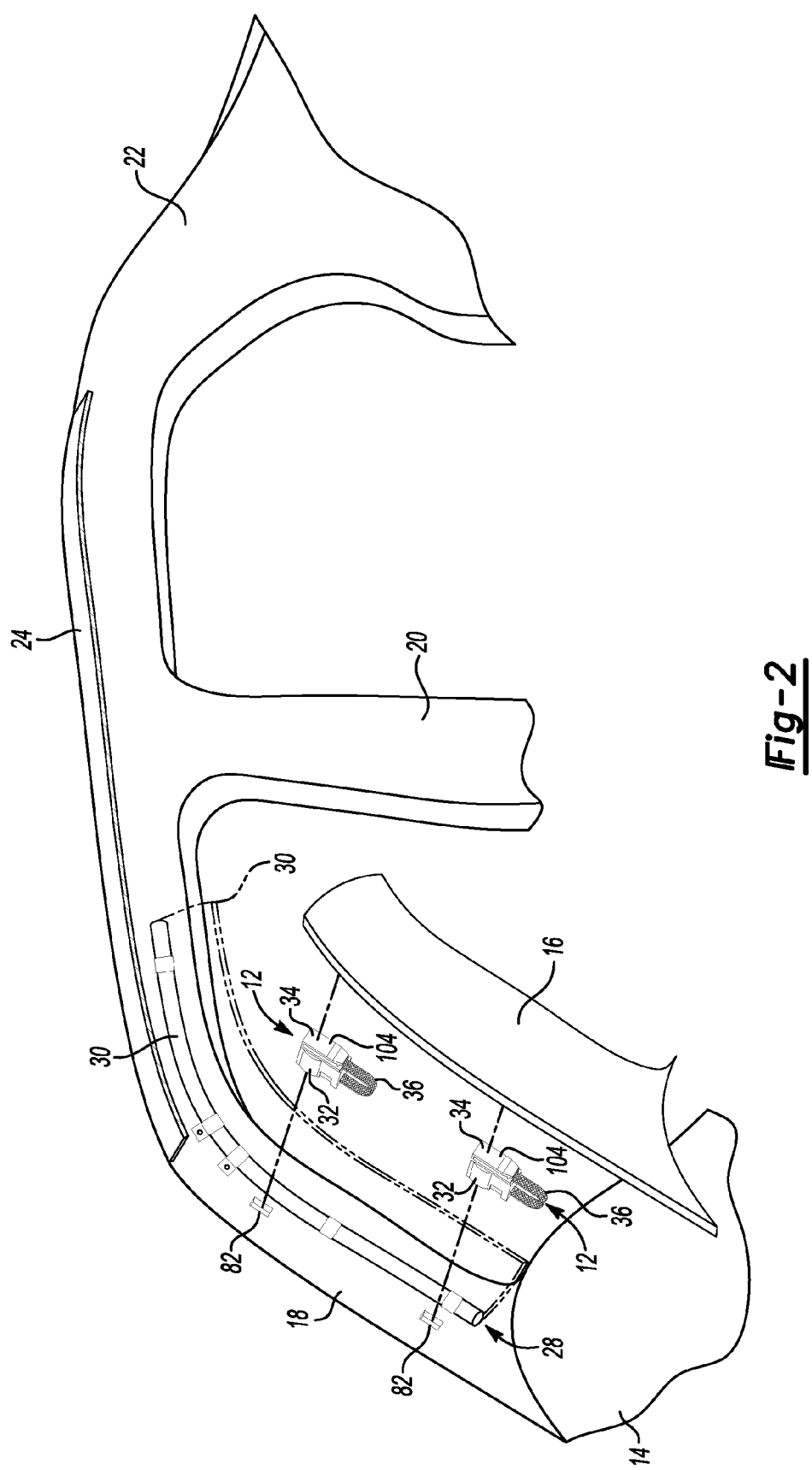
FIG. 2 is a schematic perspective view of a vehicle structure and an airbag device attached to the vehicle structure, with a plurality of clip assemblies and a trim panel exploded from the vehicle structure.

Turning to FIGS. 1 and 2, the vehicle 10 includes a vehicle structure 14 and a trim panel 16 coupled to the vehicle structure 14. The vehicle structure 14 can be a vehicle frame, a chassis, a support, a bracket, a pillar or any other suitable vehicle structure. For example, in FIGS. 1 and 2, the vehicle structure 14 can include an A-pillar 18 of the vehicle 10, a B-pillar 20 of the vehicle 10, a C-pillar 22 of the vehicle 10, a roof rail, and/or a roof 24 of the vehicle 10. The vehicle structure 14 can form a passenger compartment 26 of the vehicle 10. Generally, the pillars 18, 20, 22 and the roof 24 can cooperate to form the passenger compartment 26 of the vehicle 10. As such, one or more occupants can enter and exit the passenger compartment 26 as desired. It is to be appreciated that there are pillars 18, 20, 22 on both a driver's side of the vehicle 10 and a passenger side of the vehicle 10.

Figure 3:
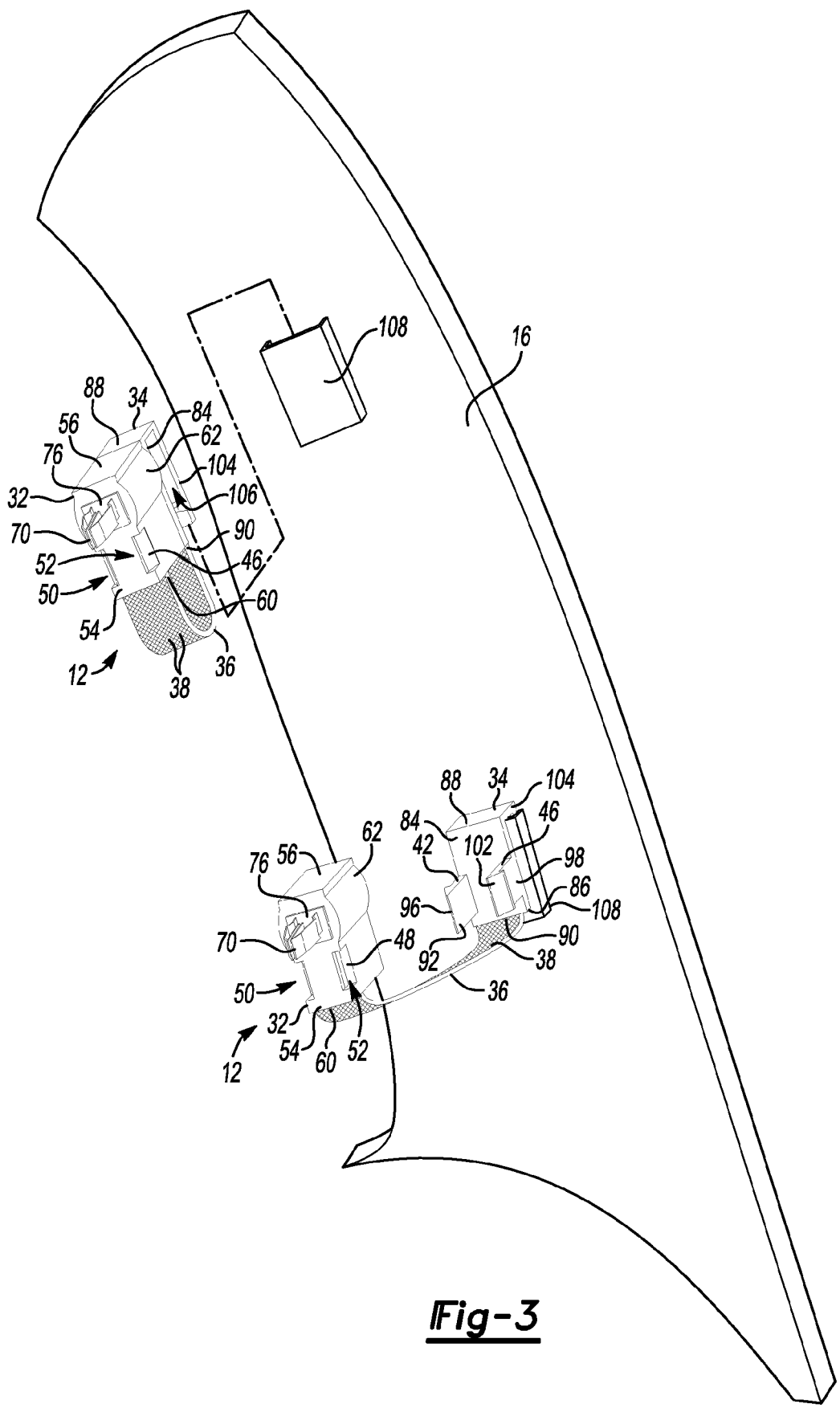
FIG. 3 is a schematic perspective back side view of the trim panel with the vehicle structure removed to illustrate the clip assemblies, and with one clip assembly exploded from the trim panel in a pre-deployed position and another clip assembly in a deployed position such that the first and second housings are detached from each other while the second housing remains attached to the trim panel.

Generally, the trim panel 16 covers the vehicle structure 14 inside the passenger compartment 26. The trim panel 16 can be coupled to one or more of the pillars 18, 20, 22 and/or the roof 24. Therefore, a plurality of trim panels 16 can be disposed inside the passenger compartment. Furthermore, the trim panel 16 can be referred to as a trim piece, a headliner, garnish trim, garnish, interior trim, interior garnish, etc. For illustrative purposes only, the trim panel 16 in FIGS. 2 and 3 is illustrated as coupling to the A-pillar 18 of the passenger side of the vehicle 10.

As best shown in FIG. 2, the vehicle 10 can also include at least one airbag device 28 attached to the vehicle structure 14. The airbag device 28 can be covered by the trim panel 16 to conceal the airbag device 28 inside the passenger compartment 26. Generally, the airbag device 28 is concealed from the occupant(s) inside the passenger compartment 26 for aesthetic purposes. In certain situations, the airbag device 28 can be activated to expand a bladder 30 to protect the occupant(s) of the vehicle 10 from engaging the vehicle structure 14. For example, the bladder 30 can be expanded during an airbag deployment condition when a predetermined force engages the vehicle 10. When the bladder 30 expands during and after the airbag deployment condition, a deployment force is applied to the trim panel 16 by the bladder 30 which causes the trim panel 16 to move away from the vehicle structure 14 and allow the bladder 30 to be exposed or visible inside the passenger compartment 26 such that the bladder 30 covers various components inside the passenger compartment 26 to protect the occupant(s). FIG. 1 illustrates the airbag device 28 before the airbag deployment condition. FIG. 2 illustrates the airbag device 28 coupled to the A-pillar 18, with the airbag device 28 in solid lines before the airbag deployment condition, and in phantom lines after the airbag deployment condition. Specifically, FIG. 2 illustrates the bladder 30 expanded in phantom lines when the airbag deployment condition occurs. It is to be appreciated that the airbag device 28 can be coupled to the vehicle structure 14 in other locations, such as for example, the B-pillar 20, the C-pillar 22, the roof rail between the A-pillar 18 and the B-pillar 20, the roof rail between the B-pillar 20 and the C-pillar 22, etc.

Figure 7:
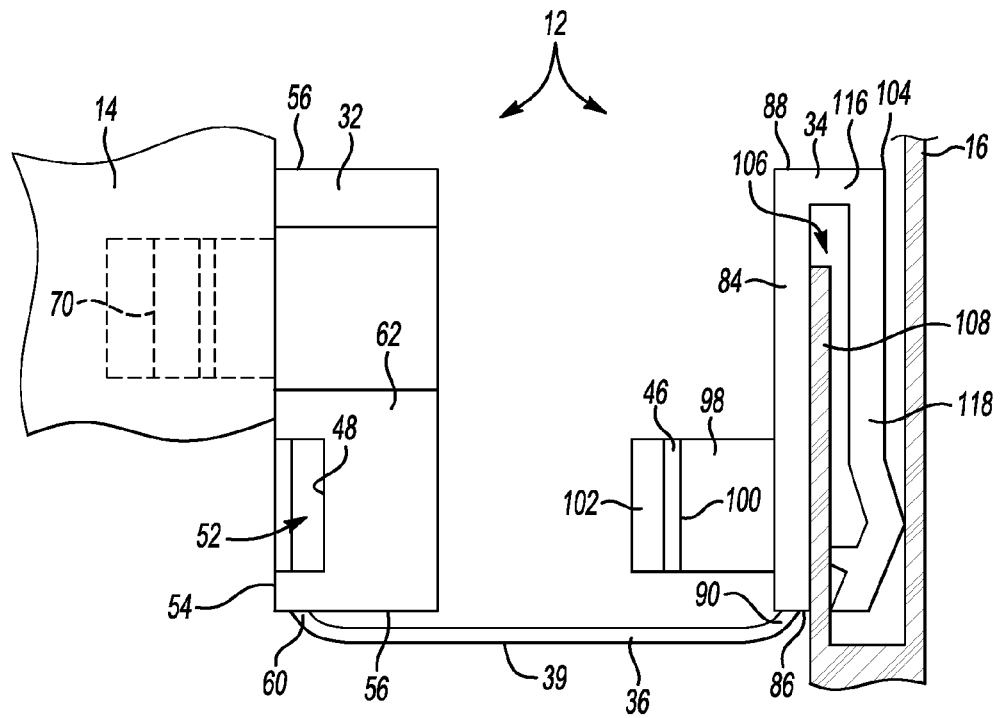
FIG. 7 is a schematic broken side view of the vehicle structure and the trim panel cross-sectioned, with the clip assembly attached to the vehicle structure and the trim panel in the deployed position.

Turning to FIGS. 2-7, the clip assembly 12 includes a first housing 32 adapted to be attached to the vehicle 10. Additionally, the clip assembly 12 includes a second housing 34 attached to the first housing 32 to define a pre-deployed position and detached from the first housing 32 to define a deployed position. In other words, the first and second housings 32, 34 are secured to each other when in the pre-deployed position and the first and second housings 32, 34 are spaced from each other when in the deployed position. Generally, the pre-deployed position occurs before the airbag deployment condition and the deployed position occurs during/after the airbag deployment condition. In certain embodiments, more specifically, the first housing 32 is attached to the vehicle structure 14 and the second housing 34 is attached to the trim panel 16 such that the clip assembly 12 couples the trim panel 16 to the vehicle structure 14. The pre-deployed position is shown in FIGS. 2, 4, 6 and 9 and the deployed position is shown in FIG. 7. Additionally, one clip assembly 12 is shown in the pre-deployed position in FIG. 3 and another clip assembly 12 is shown in the deployed position in FIG. 3. Details of the first and second housings 32, 34 are discussed further below.

Figure 4:
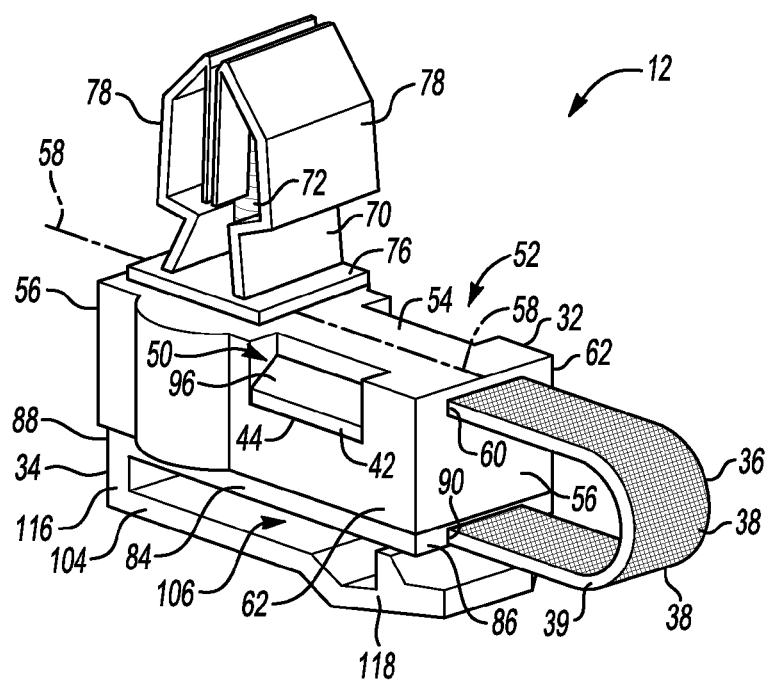
FIG. 4 is a schematic perspective view of the clip assembly, with the first and second housings attached to each other in the pre-deployed position and an attachment member being in a different orientation relative to the first housing, and with a strap having a first length.
Figure 5:
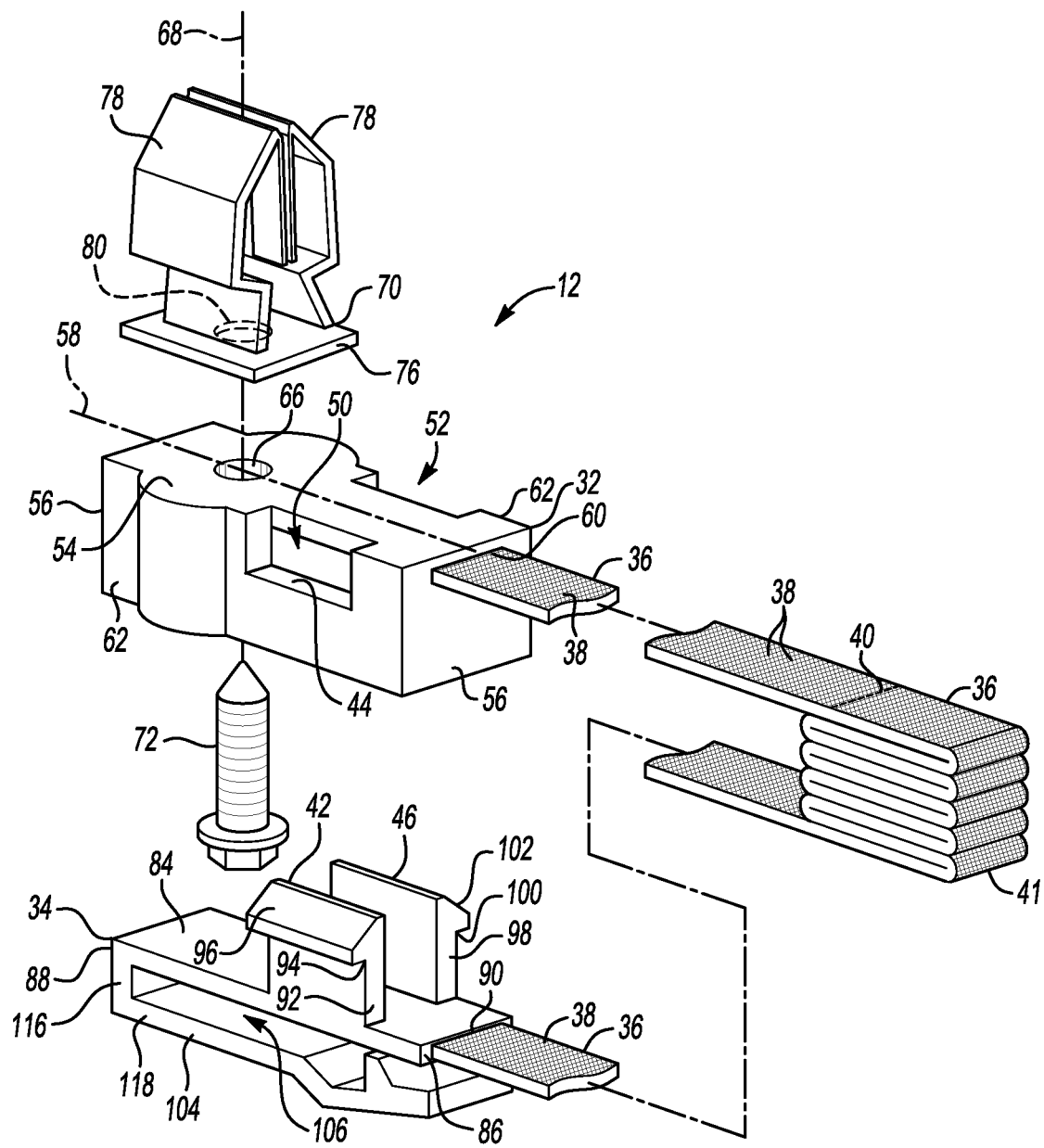
FIG. 5 is a schematic exploded perspective view of the clip assembly and the strap having a second length.
Figure 6:
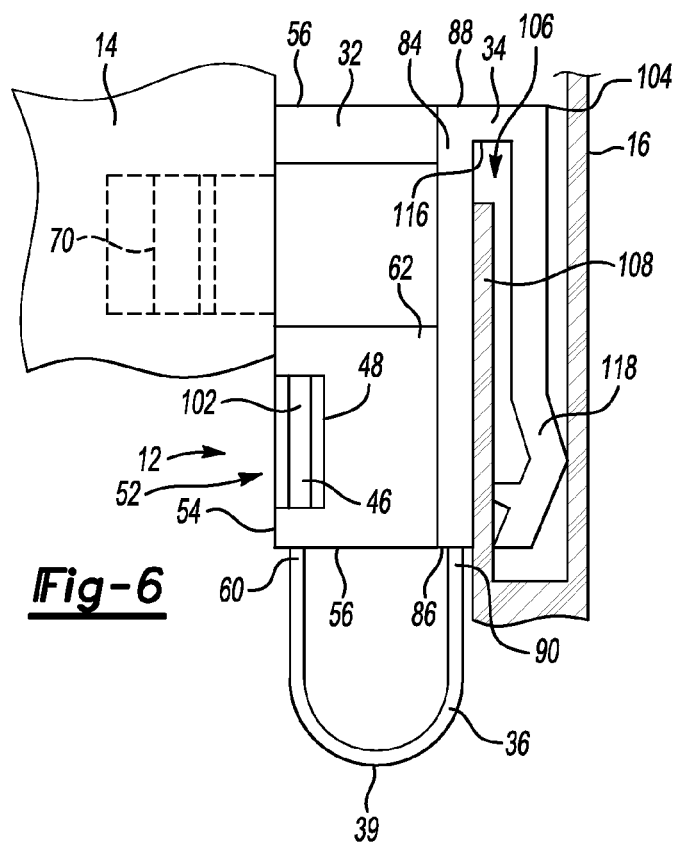
FIG. 6 is a schematic broken side view of the vehicle structure and the trim panel cross-sectioned, with the clip assembly attached to the vehicle structure and the trim panel in the pre-deployed position.

As best shown in FIGS. 4 and 5, the clip assembly 12 further includes a strap 36 formed of a plurality of strands 38 braided together. Simply stated, the strands 38 can be woven, intertwined and/or interlaced to form the strap 36. The strap 36 is affixed to the first and second housings 32, 34 to tether together the first and second housings 32, 34 in both the pre-deployed and deployed positions.

Generally, the strap 36 can be formed of a first material. The first material can be further defined as a polymeric material. More specifically, the first material can be a thermoplastic polyamide, such as nylon. One example of a suitable nylon for the first material is nylon 6. Alternatively, as another example, the first material can be polyester. As such, the strap 36 is formed of the strands 38 braided together to provide flexibility to the strap 36 and strength to the strap 36 such that the strap 36 withstands the deployment force created by the bladder 30 expanding when the airbag deployment condition occurs. In other words, when the bladder 30 expands, the strap 36 withstands the deployment force such that the trim panel 16 remains coupled to the vehicle structure 14. Furthermore, the strap 36, formed of the strands 38 braided together, is resistant to temperature changes and thus does not become brittle due to temperature fluctuations. Therefore, whether the weather is hot, cold or mild, the strap 36 will withstand the deployment force of the bladder 30 expanding when the airbag deployment condition occurs such that the trim panel 16 remains coupled to the vehicle structure 14. It is to be appreciated that the strap can be a seat belt or safety belt material braided together as utilized to restrain the occupant(s) inside the passenger compartment 26.

Generally, the strap 36 can be adjusted or modified for different vehicle configurations or specifications. Therefore, the strap 36 can be any suitable length to allow the clip assembly 12 to be utilized for a plurality of different vehicles. For example, FIGS. 2-4, 6 and 7 illustrates the strap 36 having a first length 39 and FIG. 5 illustrates the strap 36 having a second length 41 different from the first length 39. In one embodiment, the second length 41 is greater than the first length 39. For example, as shown in FIG. 7, the second housing 34 travels a first distance away from the first housing 32 when in the deployed position which generally corresponds to a maximum of the first length 39 of the strap 36. In other words, the first distance is generally equal to or less than the first length 39 of the strap 36. For illustrative purposes, FIG. 7 illustrates the first distance less than the first length 39 of the strap 36. It is to be appreciated that a thickness of the strap 36 can be adjusted or modified for different vehicle configurations or specifications.

As another example, the second housing 34 travels a second distance away from the first housing 32 when in the deployed position which generally corresponds to a maximum of the second length 41 of the strap 36. In other words, the second distance is generally equal to or less than the second length 41 of the strap 36. More specifically, the second housing 34 travels the first distance away from the first housing 32 when in the deployed position which generally corresponds to the maximum of the first length 39 of the strap 36 to allow the trim panel 16 to move away from the vehicle structure 14 a first distance of travel (see FIG. 7) when the airbag deployment condition occurs, and the second housing 34 travels the second distance away from the first housing 32 when in the deployed position which generally corresponds to the maximum of the second length 41 of the strap 36 to allow the trim panel 16 to move away from the vehicle structure 14 a second distance of travel when the airbag deployment condition occurs. It is to be appreciated that the strap 36 can optionally stretch when the airbag deployment condition occurs and the maximum of the first and second lengths 39, 41 can account for stretching.

Figure 9:
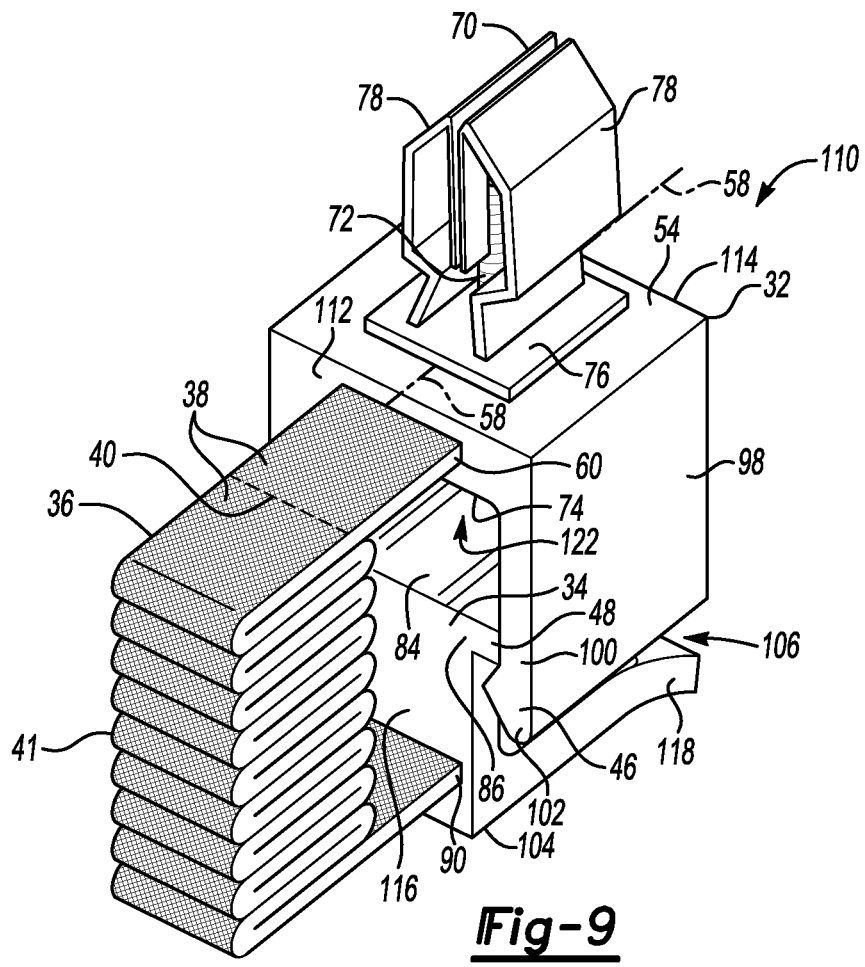
FIG. 9 is a schematic perspective view of the clip assembly of a second embodiment in the pre-deployed position.

Optionally, the strap 36 can be folded and secured in a folded position as shown in FIGS. 5 and 9 which reduces an amount of lengthwise space the strap 36 occupies between the vehicle structure 14 and the trim panel 16. For example, stitches 40 can be sewn through the strap 36 to maintain the strap 36 in the folded position. The stitches 40 holding the strap 36 in the folded position will tear away or separate when the airbag deployment condition occurs to allow the strap to unfold.

As best shown in FIGS. 3 and 5, one of the first and second housings 32, 34 can include a first tab 42 extending outwardly therefrom. Furthermore, another one of the first and second housings 32, 34 can include a first shoulder 44. Generally, the first tab 42 engages the first shoulder 44 to attach together the first and second housings 32, 34 in the pre-deployed position (see FIG. 4). Therefore, the first tab 42 disengages the first shoulder 44 to separate the first and second housings 32, 34 in the deployed position.

Figure 10:
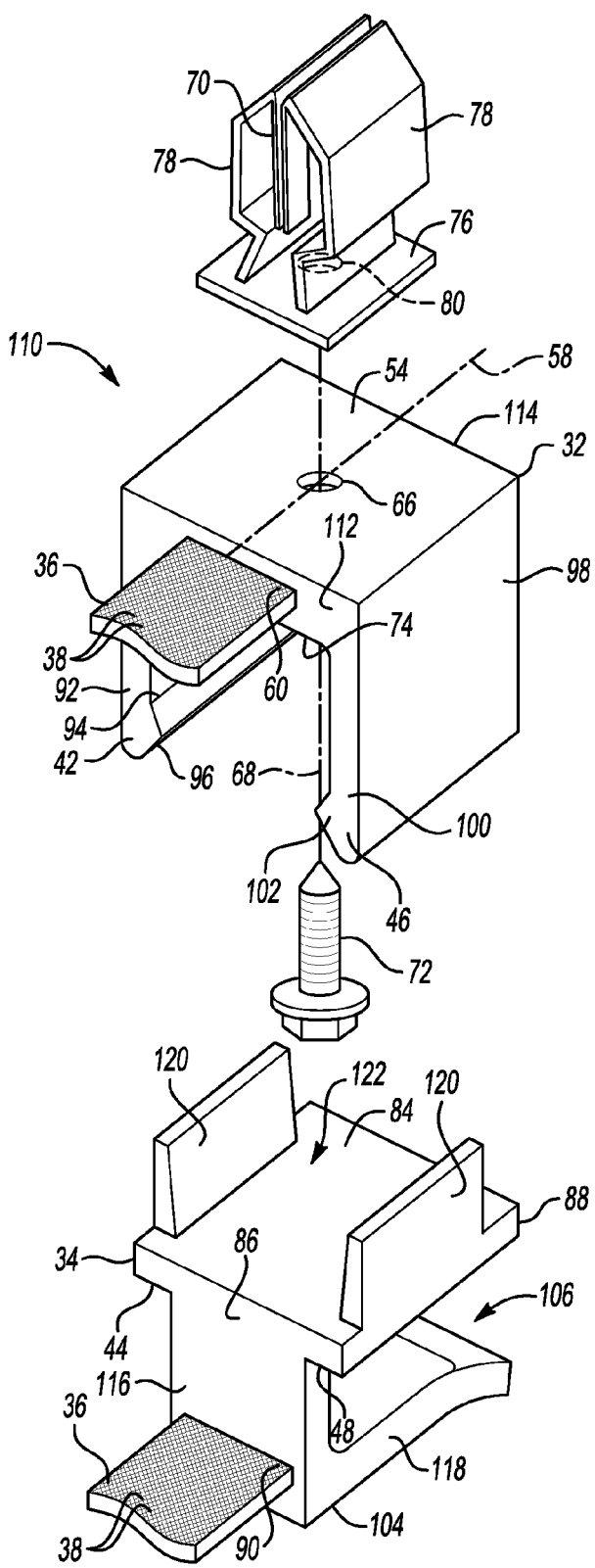
FIG. 10 is a schematic exploded perspective view of the clip assembly of the second embodiment.

Continuing with FIGS. 3, 5 and 7, additionally, one of the first and second housings 32, 34 can include a second tab 46 extending outwardly therefrom and generally aligns with the first tab 42 in a spaced relationship. Furthermore, another one of the first and second housings 32, 34 can include a second shoulder 48 generally aligning with the first shoulder 44 in a spaced relationship. Simply stated, one of the first and second housings 32, 34 include the first and second tabs 42, 46 each extending outwardly therefrom, and the other one of the first and second housings 32, 34 include the first and second shoulders 44, 48. Generally, the second tab 46 engages the second shoulder 48 to attach together the first and second housings 32, 34 in the pre-deployed position. Therefore, the second tab 46 disengages the second shoulder 48 to separate the first and second housings 32, 34 in the deployed position. In one embodiment, as best shown in FIGS. 3-5 and 7, the first housing 32 includes the first and second shoulders 44, 48 and the second housing 34 includes the first and second tabs 42, 46. In another embodiment, as shown in FIGS. 9 and 10, the first housing 32 includes the first and second tabs 42, 46 and the second housing 34 includes the first and second shoulders 44, 48.

In certain embodiments, as best shown in FIGS. 4 and 5, the first housing 32 can define a first aperture 50 such that the first housing 32 presents the first shoulder 44 adjacent to the first aperture 50. The first tab 42 is disposed through the first aperture 50 when in the pre-deployed position. Therefore, the first tab 42 is disposed through the first aperture 50 and engages the first shoulder 44 when in the pre-deployed position.

Figure 8:
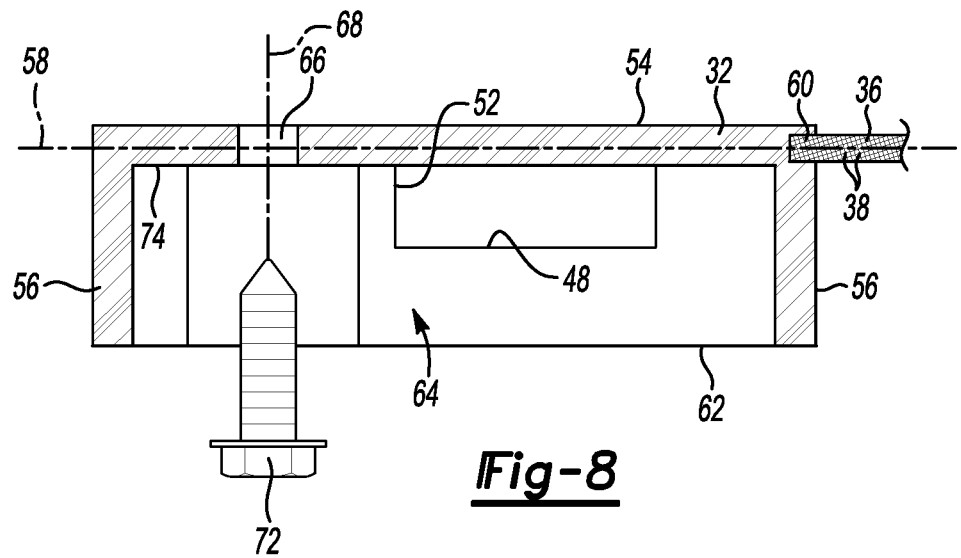
FIG. 8 is a schematic cross-sectional view of the first housing and the strap, with a fastener exploded from the first housing.

Turning to FIGS. 3, 5 and 8, furthermore, in certain embodiments, the first housing 32 can define a second aperture 52 generally aligning with the first aperture 50 in a spaced relationship such that the first housing 32 presents the second shoulder 48 adjacent to the second aperture 52. The second tab 46 is disposed through the second aperture 52 when in the pre-deployed position. Therefore, the second tab 46 is disposed through the second aperture 52 and engages the second shoulder 48 when in the pre-deployed position.

Turning to FIGS. 3-6 and 8, the first housing 32 can include a base wall 54 and a plurality first side walls 56 extending from the base wall 54 in a spaced and generally parallel relationship. The base wall 54 extends along a first axis 58, with the first side walls 56 extending transverse to the first axis 58. Furthermore, the first side walls 56 are spaced from each other relative to the first axis 58. Generally, a first end 60 of the strap 36 is affixed to the first housing 32. In certain embodiments, as shown in FIGS. 3-6, the first end 60 of the strap 36 is affixed to one of the first side walls 56. It is to be appreciated that lengthwise as discussed above refers to being along the first axis 58.

Continuing with FIGS. 3-6, additionally, the first housing 32 can include a plurality of second side walls 62 extending from the base wall 54 in a spaced and generally parallel relationship. The second side walls 62 also extend transverse to the first axis 58. Therefore, the first side walls 56 are disposed adjacent to the second side walls 62 such that the first and second side walls 56, 62 cooperate with each other. Furthermore, the base wall 54 and one of the second side walls 62 cooperate to define the first aperture 50, and similarly, the base wall 54 and the other one of the second side walls 62 cooperate to define the second aperture 52. As such, one of the second side walls 62 present the first shoulder 44 and the other one of the second side walls 62 present the second shoulder 48.

Turning to FIG. 8, the first and second side walls 56, 62 can extend away from the base wall 54 to define a recess 64 therebetween. Therefore, the recess 64 is disposed transverse to the first axis 58. It is to be appreciated that the recess 64 can be any suitable configuration.

Furthermore, referring to FIGS. 5 and 8, the base wall 54 can define a hole 66 cooperating with the recess 64. Additionally, the hole 66 is spaced from the first and second apertures 50, 52. The hole 66 generally extends along a second axis 68 transverse to the first axis 58. In certain embodiments, the second axis 68 can be perpendicular to the first axis 58. It is to be appreciated that the hole 66 can be any suitable configuration.

Turning to FIGS. 3-7, the clip assembly 12 further includes an attachment member 70 attachable to the first housing 32 and detachable from the first housing 32 to adjust the attachment member 70 relative to the first housing 32. The attachment member 70 extends outwardly from the base wall 54 away from the recess 64. The attachment member 70 is attached to the first housing 32 with the hole 66.

The attachment member 70 can be formed of a metal material. For example, one suitable metal material is steel, such as spring steel. It is to be appreciated that the attachment member 70 can be formed of any suitable metal material to maintain engagement of the attachment member 70 with the vehicle structure 14 when the airbag deployment condition occurs. As discussed further below, the attachment member 70 can be replaced with another attachment member 70. Being able to replace the attachment member 70 allows different metal gauges to be utilized for the attachment member 70, which provides versatility of the clip assembly 12.

Referring to FIGS. 4, 5 and 8, specifically, a fastener 72 is utilized to attach the attachment member 70 to the first housing 32. For example, the fastener 72 can be inserted through the hole 66 and engages the attachment member 70 to attach or secure the attachment member 70 to the first housing 32. Specifically, the fastener 72 can be disposed in the recess 64, with a portion of the fastener 72 engaging a back side 74 of the base wall 54 inside the recess 64, and another portion of the fastener 72 disposed outside of the recess 64 and engaging the attachment member 70. The fastener 72 can be threaded, barbed, etc., and/or the fastener 72 can be further defined as a bolt, a screw, a pin, a nut, a coupler, etc.

The attachment member 70 can include a platform 76 and one or more biasing portions 78 extending from the platform 76. The platform 76 can define a cutout 80 generally aligning with the hole 66 such that the fastener 72 can extend through the hole 66 and the cutout 80 to attach the attachment member 70 to the first housing 32. For example, the cutout 80 can be disposed coaxially relative to the second axis 68. The biasing portions 78 engage the vehicle structure 14 to attach or secure the clip assembly 12 to the vehicle structure 14.

Generally, the attachment member 70 can be rotatable relative to the first housing 32 to change an orientation of the attachment member 70 relative to the first housing 32 (compare FIGS. 3 and 4). More specifically, the attachment member 70 is rotatable relative to the base wall 54 to change the orientation of the attachment member 70 relative to the first housing 32. For example, the attachment member 70 can be rotated about the second axis 68. The attachment member 70 is attached to the base wall 54 of the first housing 32 and the attachment member 70 faces away from the recess 64. The attachment member 70 engages the vehicle structure 14 to attach the clip assembly 12 to the vehicle structure 14 in both the pre-deployed and deployed positions. In other words, when the attachment member 70 is attached to the vehicle structure 14, the clip assembly 12, and more specifically, the first housing 32 remains attached to the vehicle structure 14 before, during and after the airbag deployment condition occurs. Therefore, the attachment member 70 can be re-orientated for attaching the clip assembly 12 at different locations along the vehicle structure 14.

Specifically, the attachment member 70 is adjustable to allow the first and second housings 32, 34 to be formed of a standardized configuration to be utilized in different locations along the vehicle structure 14 or to be utilized in different vehicle configurations or specifications. In other words, the first and second housings 32, 34 are universal while the attachment member 70 is movable, de-attachable, and interchangeable. Therefore, the clip assembly 12 is versatile for different vehicles. For example, the attachment member 70 can be rotated or turned relative to the first housing 32 to accommodate one or more of the vehicle configurations or to accommodate different locations along the vehicle structure 14. As another example, the attachment member 70 can be replaced with another attachment member 70. When replacing the attachment member 70, the same type of attachment member 70 can be reattached to the first housing 32 or a different type of attachment member 70 can be reattached to the first housing 32. For example, one type of attachment member 70 is a high retention attachment member 70. Different metal gauges can be utilized for the attachment member 70, and therefore, the attachment member 70 can be replaced with another attachment member 70 having a different metal gauge. The attachment member 70 is adjustable to accommodate different deployment forces of the airbag device for different vehicles such that the attachment member 70 remains in engagement with the vehicle structure 14 when the clip assembly 12 is in the deployed position. Therefore, different attachment members 70 can be utilized to accommodate different deployment forces. For example, if the deployment force is low, a low force resistant attachment member 70 is attached to the first housing 32, and potentially the attachment member 70 is formed of a lower gauge metal which withstands this deployment force. If the deployment force is high, a high force resistant attachment member 70 can be attached to the first housing 32, and potentially the attachment member 70 is formed of a higher gauge metal which withstands this deployment force. Therefore, having the attachment member 70 detachable or removable from the first housing 32 provides versatility for the clip assembly 12.

Turning back to FIGS. 2, 3 and 6, the vehicle structure 14 defines a slot 82 to receive the attachment member 70. Therefore, the attachment member 70 engages the vehicle structure 14 within the slot 82 to secure the first housing 32 to the vehicle structure 14. The slot 82 is complimentary to the attachment member 70 such that the attachment member 70 engages the vehicle structure 14 within the slot 82. Specifically, the attachment member 70 is attached to the vehicle structure 14 within the slot 82 in an orientation that the attachment member 70 will not release from the vehicle structure 14 during and after the airbag deployment condition occurs. For example, in FIG. 2, the slot 82 is illustrated along the A-pillar 18, and therefore, the clip assembly 12 is utilized along the A-pillar 18. It is to be appreciated that the slot 82 can be defined in the B-pillar 20, the C-pillar 22, the roof rail between the A-pillar 18 and the B-pillar 20, the roof rail between the B-pillar 20 and the C-pillar 22, etc. Furthermore, a plurality of slots 82 can be defined in one or more of the A-pillar 18, the B-pillar 20, the C-pillar 22, the roof rail between the A-pillar 18 and the B-pillar 20, the roof rail between the B-pillar 20 and the C-pillar 22, etc. In FIG. 2, for illustrative purposes, more than one slot 82 is illustrated in the vehicle structure 14 along the A-pillar 18.

Turning to FIGS. 3-5, the second housing 34 can include a body 84 having a first side end 86 and a second side end 88 spaced from each other. Generally, the first and second side ends 86, 88 are spaced from each other relative to the first axis 58. As such, the first side end 86 is disposed adjacent to one of the first side walls 56 and the second side end 88 is disposed adjacent to the other one of the first side walls 56 when in the pre-deployed position.

Continuing with FIGS. 3-5, furthermore, generally, a second end 90 of the strap 36 is affixed to the second housing 34. More specifically, the first end 60 of the strap 36 is affixed to the first housing 32 and the second end 90 of the strap 36 is affixed to the second housing 34 to tether together the first and second housings 32, 34. In certain embodiments, the second end 90 of the strap 36 is affixed to one of the first and second side ends 86, 88 while the first end 60 of the strap 36 is affixed to one of the first side walls 56. For example, as shown in FIG. 4, the first end 60 of the strap 36 is affixed to one of the first side walls 56 and the second end 90 of the strap 36 is affixed to the first side end 86; and therefore, the strap 36 extends outwardly from the same end of the clip assembly 12 but opposing the second side end 88. It is to be appreciated that the first end 60 of the strap 36 can be affixed to the other one of the first side walls 56 and the second end 90 of the strap 36 can be affixed to the second side end 88, and therefore, the strap 36 extends outwardly from the same end of the clip assembly 12, but in this configuration, from the end opposing the first side end 86. It is to be appreciated that the strap 36 can extend from the first and second housings 32, 34 in any suitable orientation.

Turning to FIGS. 3-5, the first tab 42 can include a first leg 92 extending from the body 84 to a distal end 94, with a first protrusion 96 disposed at the distal end 94 of the first leg 92. Similarly, the second tab 46 can include a second leg 98 extending from the body 84 to a distal end 100, with a second protrusion 102 disposed at the distal end 100 of the second leg 98. Therefore, simply stated, the first and second legs 92, 98 each extend from the body 84 in a spaced relationship. The first protrusion 96 engages the first shoulder 44 and the second protrusion 102 engages the second shoulder 48 to attach together the first and second housings 32, 34 in the pre-deployed position. The body 84 can cover the recess 64 when the first and second housings 32, 34 are attached to each other in the pre-deployed position. For the embodiment of FIGS. 2-8, the first leg 92 of the first tab 42 and the second leg 98 of the second tab 46 can each be disposed inside the recess 64 when the first and second housings 32, 34 are attached to each other in the pre-deployed position. Disposing the first and second legs 92, 98 inside the recess 64, instead of outside of the recess 64, decrease the packaging size of the clip assembly 12.

The first and second legs 92, 98 move out of the recess 64 when the first and second housings 32, 34 are separate from each other in the deployed position. Furthermore, the first protrusion 96 disengages the first shoulder 44 and the second protrusion 102 disengages the second shoulder 48 when the first and second housings 32, 34 separate in the deployed position. As such, the deployment force during the airbag deployment condition overcomes the force of the first and second tabs 42, 46 engaging the first and second shoulders 44, 48 respectively to separate the first and second housings 32, 34 in the deployed position. In other words, the first and second tabs 42, 46 bias out of engagement with the first and second shoulders 44, 48 respectively during the airbag deployment condition. Additionally, the recess 64 is uncovered when the first and second housings 32, 34 separate from each other in the deployed position.

Referring to FIGS. 3-7, the second housing 34 can also include an arm 104 extending from the body 84 adjacent to one of the first and second side ends 86, 88. Generally, the arm 104 extends in a spaced relationship toward another one of the first and second side ends 86, 88 to define a slit 106. The trim panel 16 is disposed in the slit 106 to attach the second housing 34 to the trim panel 16 in both the pre-deployed and deployed positions. In other words, when the arm 104 is attached to the trim panel 16, the clip assembly 12, and more specifically, the second housing 34 remains attached to the trim panel 16 before and after the airbag deployment condition occurs.

The arm 104 extending from the body 84 of the second housing 34 can include a first extension 116 extending from the body 84 transverse to the first axis 58 and a second extension 118 extending from the first extension 116 toward one of the first and second side ends 86, 88. The first and second extensions 116, 118 cooperate with the body 84 to define the slit 106. The second end 90 of the strap 36 can extend from one of the first extension 116 and the first and second side ends 86, 88 of the body 84. For example, the second end 90 of the strap 36 can extend from one of the first and second side ends 86, 88 of the body 84 as shown in FIGS. 2-7. Alternatively, the second end 90 of the strap 36 can extend from the first extension 116.

The trim panel 16 can include a support 108 (see FIGS. 3, 6 and 7) with the support 108 disposed in the slit 106 such that the arm 104 engages the support 108 to attach the second housing 34 to the trim panel 16. The support 108 extends outwardly from the trim panel 16 such that the support 108 can be disposed in the slit 106. Generally, the second housing 34 is attached to the trim panel 16 to define a trim unit. Specifically, during assembly of the vehicle 10, the second housing 34 is attached to the trim panel 16 when the clip assembly 12 is in the pre-deployed position to define the trim unit. After the second housing 34 is attached to the trim panel 16, and more specifically, the clip assembly 12 is attached to the trim panel 16, the trim unit is attached to the vehicle structure 14. Therefore, the clip assembly 12 is attached to the trim panel 16 before the trim panel 16 is coupled to the vehicle structure 14. Assembling the trim unit in this manner ensures that the clip assembly 12 is installed in each vehicle 10.

The first and second housings 32, 34 can each be formed of a second material different from the first material. The second material can be further defined as a polymeric material. More specifically, the second material can be a thermoplastic polyamide, such as nylon. One example of a suitable nylon for the second material is nylon 6,6. An example of another suitable nylon is commercially available under the trade name Zytel® by DuPont™ The first and second housings 32, 34 can be formed of a non-woven or non-braided material that can be molded, while the strap 36 is formed of a woven or braided material.

The vehicle 10 can utilize one clip assembly 12 or a plurality of clip assemblies 12 as shown in FIGS. 2 and 3. For example, generally the vehicle 10 has two A-pillars 18, so one or more clip assemblies 12 can be utilized for one A-pillar 18 and one or more clip assemblies 12 can be utilized for the other A-pillar 18, etc. Furthermore, as briefly indicated above, the clip assembly 12 can be formed of various suitable configurations. FIGS. 2-8 illustrate a first embodiment of the clip assembly 12 and FIGS. 9 and 10 illustrate a second embodiment of the clip assembly 110. It is to be appreciated that one or more of both of the embodiments of the clip assembly 12, 110 can be attached to the trim panel 16, or one clip assembly 12, 110 can be attached to one trim panel 16 and another clip assembly 12, 110 can be attached to another trim panel 16, or the trim panels 16 can utilize only one of the embodiments of the clip assemblies 12, 110. For example, as shown in FIG. 3, a plurality of supports 108 can extend from the trim panel 16, with one clip assembly 12, 110 attached to one of the supports 108 and another clip assembly 12, 110 attached to another one of the supports 108. Alternatively, one clip assembly 12, 110 can be utilized with one trim panel 16, with the clip assembly 12, 110 attached to either one of the supports 108. When the trim panel 16 only utilizes one clip assembly 12, 110, a basic or generic clip, different from the clip assemblies 12, 110 discussed herein, can be attached to the other one of the supports 108 and the vehicle structure 14.

Differences between the first and second embodiments of the clip assembly 12, 110 are discussed below. Therefore, similar or like features for both embodiments will have the same reference numerals and will not be re-discussed below in detail. It is to be appreciated that the clip assembly 110 for the second embodiment can be formed of the same materials discussed above for the clip assembly 12 of the first embodiment.

For the second embodiment of the clip assembly 110 (see FIGS. 9 and 10), the first and second tabs 42, 46 extend from the first housing 32 (as compared to the tabs 42, 46 extending from the second housing 34 in FIGS. 3, 5 and 7), and furthermore, the first and second shoulders 44, 48 extend from the second housing 34 (as compared to the shoulders 44, 48 extending from the first housing 32 in FIGS. 3, 5 and 7). In the embodiment of FIGS. 9 and 10, the first and second side walls 56, 62 are eliminated from the first housing 32 and the first end 60 of the strap 36 is affixed to base wall 54 of the first housing 32. Specifically, the base wall 54 includes a first side surface 112 and a second side surface 114 spaced from each other, with the first end 60 of the strap 36 extending from one of the first and second side surfaces 112, 114. Generally, the first and second side surfaces 112, 114 are spaced from each other relative to the first axis 58. In FIGS. 9 and 10, for illustrative purposes only, the first end 60 of the strap 36 extends from the first side surface 112. It is to be appreciated that the first and second apertures 50, 52 have been eliminated for the embodiment of FIGS. 9 and 10.

Furthermore, for the embodiment of FIGS. 9 and 10, the first and second tabs 42, 46 extend from the base wall 54 of the first housing 32 in a spaced relationship. The first tab 42 includes the first leg 92 extending from the base wall 54 to the distal end 94, with the first protrusion 96 disposed at the distal end 94 of the first leg 92. Similarly, the second tab 46 includes the second leg 98 extending from the base wall 54 to the distal end 100, with the second protrusion 102 disposed at the distal end 100 of the second leg 98. When comparing the first and second embodiments of the clip assemblies 12, 110, the tabs 42, 46 face away from each other relative to the first axis 58 in the embodiment of FIGS. 3-5 while the tabs 42, 46 face toward each other relative to the first axis 58 in the embodiment of FIGS. 9 and 10. Therefore, the tabs 42, 46 can be disposed inside the first housing 32 in the embodiment of FIGS. 3-5 while the tabs 42, 46 are disposed outside of the second housing 34 in the embodiment of FIGS. 9 and 10. Specifically, in the embodiment of FIGS. 9 and 10, the body 84 of the second housing 34 is disposed between the tabs 42, 46. The clip assembly 110 is shown in the pre-deployed position in FIG. 9.

Continuing with FIGS. 9 and 10, the arm 104 extending from the body 84 of the second housing 34 includes a first extension 116 extending from the body 84 transverse to the first axis 58 and a second extension 118 extending from the first extension 116 toward one of the first and second side ends 86, 88. The first and second extensions 116, 118 cooperate with the body 84 to define the slit 106. The second end 90 of the strap 36 extends from one of the body 84 and the first extension 116. For example, the second end 90 of the strap 36 can extend from one of the first and second side ends 86, 88 of the body 84. Alternatively, the second end 90 of the strap 36 can extend from the first extension 116 as shown in FIGS. 9 and 10.

Referring to FIG. 10, the second housing 34 can include a plurality of projections 120 spaced from each other to define a space 122 therebetween. The projections 120 extend outwardly from the body 84 away from the second extension 118. A portion of the fastener 72 is disposed in the space 122 when the clip assembly 110 is in the pre-deployed position. The pre-deployed position is shown in FIG. 9.

Figure 11:
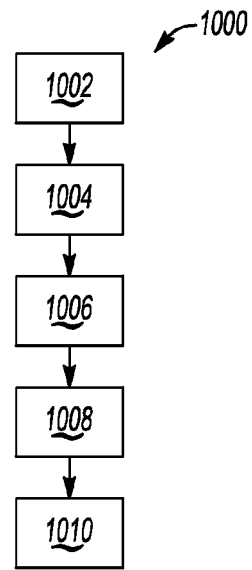
FIG. 11 is a schematic flowchart of a method of manufacturing the clip assembly of FIGS. 1-10.

Referring to FIG. 11, the present disclosure also provides a method 1000 of manufacturing the clip assembly 12, 110. The method 1000 also includes providing 1002 the strap 36 formed of the plurality of strands 38 braided together. The strap 36 can be adjusted or modified for different vehicle configurations or specifications as discussed above. Therefore, the strap 36 can be any suitable length to allow the clip assembly 12, 110 to be utilized for different vehicle configurations or specifications. As such, providing 1002 the strap 36 can include providing the strap 36 having a desired length for a specific vehicle configuration or specification. By being able to change the length of the strap 36, the clip assembly 12, 110 can be utilized with different vehicle configurations or specifications.

The method 1000 also includes affixing 1004 the first housing 32 to the first end 60 of the strap 36 and affixing 1006 the second housing 34 to the second end 90 of the strap 36 such that the strap 36 tethers together the first and second housings 32, 36 to define the clip assembly 12, 110. More specifically, affixing 1004 the first housing 32 to the first end 60 of the strap 36 can include bonding the first housing 32 to the first end 60 of the strap 36 and affixing 1006 the second housing 34 to the second end 90 of the strap 36 can include bonding the second housing 34 to the second end 90 of the strap 36. In certain embodiments, the first and second housings 32, 34 are formed by molding. More specifically, in one embodiment, the first and second housings 32, 34 are formed by injection molding. Therefore, in certain embodiments, bonding the first housing 32 to the first end 60 of the strap 36 can include molding the first housing 32 to the first end 60 of the strap 36, and similarly, bonding the second housing 34 to the second end 90 of the strap 36 can include molding the second housing 34 to the second end 90 of the strap 36. As mentioned above, the first and second housings 32, 34 are formed of the second material which can be the polymeric material such as nylon and Zytel®. Therefore, in one embodiment, the first and second housings 32, 34 are formed by injection molding Zytel®. When forming the first and second housings 32, 34 of Zytel®, Zytel® for this application has a melt processing temperature of from about 285° C. to about 305° C. and has a mold processing temperature of from about 70° C. to about 120° C.

When utilizing injection molding to form the first and second housings 32, 34, the second material is injected into a first mold for the first housing 32 and a second mold for the second housing 34. The first mold is configured to form the first housing 32 of the desired configuration and the second mold is configured to form the second housing 34 of the desired configuration. The first end 60 of the strap 36 is partially disposed in the first mold such that the second material affixes or bonds to a portion of the first end 60 of the strap 36. Similarly, the second end 90 of the strap 36 is partially disposed in the second mold such that the second material affixes or bonds to a portion of the second end 90 of the strap 36. Therefore, the strap 36 is formed of the first material which can be utilized in the injection molding process. When molding the first housing 32 to the first end 60 of the strap 36, the first end 60 of the strap 36 can remain un-melted or can partially melt. Similarly, when molding the second housing 34 to the second end 90 of the strap 36, the second end 90 of the strap 36 can remain un-melted or can partially melt. When utilizing the strap 36 formed of nylon, the nylon for this application has a melt processing temperature of from about 285° C. to about 305° C.

The method 1000 also includes attaching 1008 the attachment member 70 to the first housing 32 to further define the clip assembly 12, 110. Attaching 1008 the attachment member 70 to the first housing 32 occurs after affixing 1004 the first housing 32 to the first end 60 of the strap 36. Attaching 1008 the attachment member 70 to the first housing 32 can include adjusting the attachment member 70 relative to the first housing 32. Adjusting the attachment member 70 relative to the first housing 32 can include rotating the attachment member 70 about the second axis 68 to orientate the attachment member 70 relative to the first housing 32. Furthermore, adjusting the attachment member 70 relative to the first housing 32 can include replacing the attachment member 70 with another attachment member 70. When replacing the attachment member 70, the same type of attachment member 70 can be reattached to the first housing 32 or a different type of attachment member 70 can be reattached to the first housing 32 as discussed above.

In addition, the method 1000 can include attaching 1010 the first and second housings 32, 34 to each other to define the clip assembly 12, 110 in the pre-deployed position. Attaching 1010 the first and second housing 32, 34 to each other occurs after attaching 1008 the attachment member 70 to the first housing 32. For one embodiment, attaching 1010 the first and second housings 32, 34 to each other can include engaging together the first tab 42 of the second housing 34 and the first shoulder 44 of the first housing 32 to attach the first and second housings 32, 34 to each other. Furthermore, in this embodiment, attaching 1010 the first and second housings 32, 34 to each other can include engaging together the second tab 46 of the second housing 34 and the second shoulder 48 of the first housing 32.

In another embodiment, attaching 1010 the first and second housings 32, 34 to each other can include engaging together the first tab 42 of the first housing 32 and the first shoulder 44 of the second housing 34 to attach the first and second housings 32, 34 to each other. Additionally, in this embodiment, attaching 1010 the first and second housings 32, 34 to each other can include engaging together the second tab 46 of the first housing 32 and the second shoulder 48 of the second housing 34.

Figure 12:
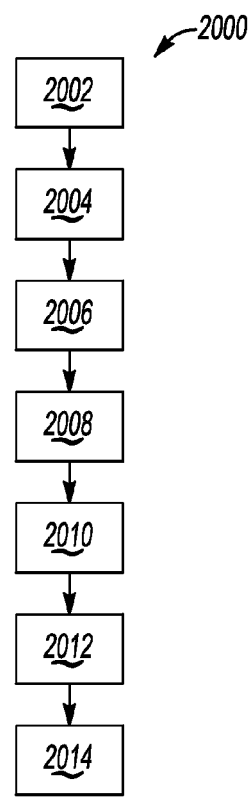
FIG. 12 is a schematic flowchart of a method of attaching the clip assembly to vehicle of FIGS. 1-10.

Referring to FIG. 12, the present disclosure can also provide a method 2000 of attaching the clip assembly 12, 110 to the vehicle 10. The method 2000 can include providing 2002 the strap 36 formed of the plurality of strands 38 braided together. The strap 36 can be adjusted or modified for different vehicle configurations or specifications as discussed above for the method 1000 and will not be re-discussed.

The method 2000 can also include affixing 2004 the first housing 32 to the first end 60 of the strap 36 and affixing 2006 the second housing 34 to the second end 90 such that the strap 36 tethers together the first and second housings 32, 34 to define the clip assembly 12, 110. More specifically, affixing 2004 the first housing 32 to the first end 60 of the strap 36 includes bonding the first housing 32 to the first end 60 of the strap 36 and affixing 2006 the second housing 34 to the second end 90 of the strap 36 includes bonding the second housing 34 to the second end 90 of the strap 36. In certain embodiments, the first and second housings 32, 34 are formed by molding as discussed above for the method 1000 and will not be re-discussed. Furthermore, when utilizing injection molding to form the first and second housings 32, 34, as discussed above for the method 1000, the second material is injected into the first and second molds as discussed above and will not be re-discussed.

The method 2000 can further include attaching 2008 the attachment member 70 to the first housing 32 to further define the clip assembly 12, 110. Attaching 2008 the attachment member 70 to the first housing 32 occurs after affixing 2004 the first housing 32 to the first end 60 of the strap 36. Attaching 2008 the attachment member 70 to the first housing 32 can include adjusting the attachment member 70 relative to the first housing 32. Adjusting the attachment member 70 relative to the first housing 32 can include rotating the attachment member 70 about the second axis 68 to orientate the attachment member 70 relative to the first housing 32. Furthermore, adjusting the attachment member 70 relative to the first housing 32 can include replacing the attachment member 70 with another attachment member 70. When replacing the attachment member 70, the same type of attachment member 70 can be reattached to the first housing 32 or a different type of attachment member 70 can be reattached to the first housing 32 as discussed above.

In addition, the method 2000 can include attaching 2010 the first and second housings 32, 34 to each other to define the clip assembly 12, 110 in the pre-deployed position and attaching 2012 the second housing 34 to the trim panel 16 when the clip assembly 12, 110 is in the pre-deployed position to define the trim unit. Attaching 2010 the first and second housings 32, 34 to each other occurs after attaching 2008 the attachment member 70 to the first housing 32. Therefore, during assembly of the vehicle 10, the clip assembly 12, 110 is attached to the trim panel 16 before coupling the trim panel 16 to the vehicle structure 14. As such, attaching 2012 the second housing 34 to the trim panel 16 when the clip assembly 12, 110 is in the pre-deployed position to define the trim unit can include engaging the arm 104 of the second housing 34 with the support 108 of the trim panel 16. Furthermore, in one embodiment, attaching 2010 the first and second housings 32, 34 to each other can include engaging together the first tab 42 of the second housing 34 and the first shoulder 44 of the first housing 32. Additionally, in this embodiment, attaching 2010 the first and second housings 32, 34 to each other can include engaging together the second tab 46 of the second housing 34 and the second shoulder 48 of the first housing 32.

Furthermore, in another embodiment, attaching 2010 the first and second housings 32, 34 to each other can include engaging together the first tab 42 of the first housing 32 and the first shoulder 44 of the second housing 34. In addition, in this embodiment, attaching 2010 the first and second housings 32, 34 to each other can include engaging together the second tab 46 of the first housing 32 and the second shoulder 48 of the second housing 34.

The method 2000 can also include attaching 2014 the trim unit to the vehicle structure 14 when the clip assembly 12, 110 is in the pre-deployed position to couple the trim panel 16 to the vehicle structure 14 and thereby attach the clip assembly 12, 110 to the vehicle 10. More specifically, attaching 2014 the trim unit to the vehicle structure 14 when the clip assembly 12, 110 is in the pre-deployed position to couple the trim panel 16 to the vehicle structure 14 can include inserting the attachment member 70 into the slot 82 defined by the vehicle structure 14 to attach the trim unit to the vehicle structure 14. The trim unit cannot be attached to the vehicle structure 14 without the clip assembly 12, 110 and therefore, this method 2000 confirms that the clip assembly 12, 110 was installed in each vehicle 10.

It is to be appreciated that the order or sequence of performing the methods 1000, 2000 as identified in the flowcharts of FIGS. 11 and 12 are for illustrative purposes and other orders or sequences are within the scope of the present disclosure. It is to also be appreciated that the methods 1000, 2000 can include other features not specifically identified in the flowcharts of FIGS. 11 and 12.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A clip assembly for a vehicle, the assembly comprising:
a first housing adapted to be attached to the vehicle;
a second housing attached to the first housing to define a pre-deployed position and detached from the first housing to define a deployed position;
a strap formed of a plurality of strands braided together, with the strap affixed to the first and second housings to tether together the first and second housings in both the pre-deployed and deployed positions; and
an attachment member attachable to the first housing and detachable from the first housing to adjust the attachment member relative to the first housing.

2. An assembly as set forth in claim 1 wherein one of the first and second housings includes a first tab extending outwardly therefrom and wherein another one of the first and second housings includes a first shoulder, with the first tab engaging the first shoulder to attach together the first and second housings in the pre-deployed position.

3. An assembly as set forth in claim 2 wherein one of the first and second housings includes a second tab extending outwardly therefrom and generally aligning with the first tab in a spaced relationship and wherein another one of the first and second housings includes a second shoulder generally aligning with the first shoulder in a spaced relationship, with the second tab engaging the second shoulder to attach together the first and second housings in the pre-deployed position.

4. An assembly as set forth in claim 3 wherein the first housing includes the first and second shoulders and the second housing includes the first and second tabs.

5. An assembly as set forth in claim 4 wherein the first housing defines a first aperture such that the first housing presents the first shoulder adjacent to the first aperture, with the first tab disposed through the first aperture when in the pre-deployed position, and wherein the first housing defines a second aperture generally aligning with the first aperture in a spaced relationship such that the first housing presents the second shoulder adjacent to the second aperture, with the second tab disposed through the second aperture when in the pre-deployed position.

6. An assembly as set forth in claim 5 wherein the first housing includes a base wall and a plurality of first side walls extending from the base wall in a spaced and generally parallel relationship, with a first end of the strap affixed to one of the first side walls.

7. An assembly as set forth in claim 6 wherein the first housing includes a plurality of second side walls extending from the base wall in a spaced and generally parallel relationship, with the first side walls disposed adjacent to the second side walls such that the first and second side walls cooperate with each other, and wherein the base wall and one of the second side walls cooperate to define the first aperture, and wherein the base wall and another one of the second side walls cooperate to define the second aperture, with one of the second side walls presenting the first shoulder and the other one of the second side walls presenting the second shoulder.

8. An assembly as set forth in claim 7 wherein the first and second side walls extend away from the base wall to define a recess therebetween such that a first leg of the first tab and a second leg of the second tab are each disposed inside the recess when the first and second housings are attached to each other in the pre-deployed position.

9. An assembly as set forth in claim 8 wherein the second housing includes a body having a first side end and a second side end spaced from each other, with the first and second legs each extending from the body, and wherein a second end of the strap is affixed to one of the first and second side ends, with the body covering the recess when the first and second housings are attached to each other in the pre-deployed position.

10. An assembly as set forth in claim 8 wherein the attachment member extends outwardly from the base wall away from the recess, with the attachment member rotatable relative to the base wall to change an orientation of the attachment member relative to the first housing.

11. A vehicle comprising:
a vehicle structure;
a trim panel coupled to the vehicle structure;
a clip assembly including a first housing attached to the vehicle structure and a second housing attached to the trim panel such that the clip assembly couples the trim panel to the vehicle structure, with the second housing attached to the first housing to define a pre-deployed position and detached from the first housing to define a deployed position;
wherein the clip assembly includes a strap formed of a plurality of strands braided together, with the strap affixed to the first and second housings to tether together the first and second housings in both the pre-deployed and deployed positions; and
wherein the clip assembly includes an attachment member attachable to the first housing and detachable from the first housing to adjust the attachment member relative to the first housing.

12. A vehicle as set forth in claim 11 wherein a first end of the strap is affixed to the first housing and a second end of the strap is affixed to the second housing to tether together the first and second housings, and wherein one of the first and second housings include a first tab and a second tab each extending outwardly therefrom, and wherein another one of the first and second housings include a first shoulder and a second shoulder, with the first tab engaging the first shoulder and the second tab engaging the second shoulder to attach together the first and second housings in the pre-deployed position.

13. A vehicle as set forth in claim 12 wherein the first housing includes the first and second shoulders and the second housing includes the first and second tabs, and wherein the first housing defines a first aperture such that the first housing presents the first shoulder adjacent to the first aperture, and wherein the first housing defines a second aperture generally aligning with the first aperture in a spaced relationship such that the first housing presents the second shoulder adjacent to the second aperture, with the first tab disposed through the first aperture when in the pre-deployed position and the second tab disposed through the second aperture when in the pre-deployed position.

14. A vehicle as set forth in claim 13 wherein the first housing includes a base wall and a plurality of first side walls extending from the base wall in a spaced and generally parallel relationship, with the first end of the strap affixed to one of the first side walls, and wherein the first housing includes a plurality of second side walls extending from the base wall in a spaced and generally parallel relationship, with the first side walls disposed adjacent to the second side walls such that the first and second side walls cooperate with each other, and wherein the base wall and one of the second side walls cooperate to define the first aperture, and wherein the base wall and another one of the second side walls cooperate to define the second aperture, with one of the second side walls presenting the first shoulder and the other one of the second side walls presenting the second shoulder.

15. A vehicle as set forth in claim 14 wherein the first and second side walls extend away from the base wall to define a recess therebetween, and wherein the base wall defines a hole cooperating with the recess, with the hole spaced from the first and second apertures, and wherein the attachment member is attached to the first housing with the hole and is rotatable relative to the first housing to change an orientation of the attachment member relative to the first housing, with the attachment member engaging the vehicle structure to attach the clip assembly to the vehicle structure in both the pre-deployed and deployed positions.

16. A vehicle as set forth in claim 15 wherein the second housing includes a body having a first side end and a second side end spaced from each other, with the second end of the strap affixed to one of the first and second side ends, and wherein the second housing includes an arm extending from the body adjacent to one of the first and second side ends and extending in a spaced relationship toward another one of the first and second side ends to define a slit, with the trim panel disposed in the slit to attach the second housing to the trim panel in both the pre-deployed and deployed positions.

17. A method of manufacturing a clip assembly, the method comprising:
providing a strap formed of a plurality of strands braided together;
affixing a first housing to a first end of the strap;
affixing a second housing to a second end of the strap such that the strap tethers together the first and second housings to define the clip assembly;
attaching an attachment member to the first housing to further define the clip assembly, and wherein attaching the attachment member to the first housing occurs after affixing the first housing to the first end of the strap.

18. A method as set forth in claim 17 wherein:
affixing the first housing to the first end of the strap includes bonding the first housing to the first end of the strap;
affixing the second housing to the second end of the strap includes bonding the second housing to the second end of the strap.

19. A method as set forth in claim 17 further comprising attaching the first and second housings to each other to define the clip assembly in a pre-deployed position and wherein attaching the first and second housing to each other occurs after attaching the attachment member to the first housing.

20. A method as set forth in claim 19 wherein attaching the first and second housings to each other includes engaging together a first tab of the second housing and a first shoulder of the first housing to attach the first and second housings to each other.

* * * * *